(12) United States Patent
Reime

(10) Patent No.: US 7,531,787 B2
(45) Date of Patent: May 12, 2009

(54) ACCESS CONTROL DEVICE

(76) Inventor: Gerd Reime, Klotzbergstrasse 60i, D-77815 Bühl (DE)

( * ) Notice: Subject to any disclaimer, the term of this patent is extended or adjusted under 35 U.S.C. 154(b) by 59 days.

(21) Appl. No.: 10/591,337

(22) PCT Filed: Mar. 7, 2005

(86) PCT No.: PCT/EP2005/002387

§ 371 (c)(1),
(2), (4) Date: Aug. 31, 2006

(87) PCT Pub. No.: WO2005/088349

PCT Pub. Date: Sep. 22, 2005

(65) Prior Publication Data

US 2007/0176777 A1 Aug. 2, 2007

(30) Foreign Application Priority Data

Mar. 9, 2004 (DE) ......... 10 2004 011 780

(51) Int. Cl.
*G08B 13/18* (2006.01)
(52) U.S. Cl. .................. 250/221; 340/556
(58) Field of Classification Search ........... 250/221, 250/222.1; 340/555, 556, 557; 49/25, 26, 49/28
See application file for complete search history.

(56) References Cited

U.S. PATENT DOCUMENTS

| | | | |
|---|---|---|---|
| 3,758,197 A | | 9/1973 | Klang et al. |
| 4,566,337 A | * | 1/1986 | Smart .................. 73/861.56 |
| 4,571,498 A | * | 2/1986 | Hagan et al. ......... 250/559.21 |
| 6,051,829 A | * | 4/2000 | Full .................... 250/221 |
| 7,122,782 B2 | * | 10/2006 | Sakaguchi ............ 250/222.1 |
| 2004/0135072 A1 | * | 7/2004 | Huff .................... 250/221 |

FOREIGN PATENT DOCUMENTS

| | | |
|---|---|---|
| DE | 29 36 201 | 4/1981 |
| DE | 100 55 689 | 5/2002 |
| DE | 101 46 639 | 4/2003 |
| DE | 102 37 202 | 2/2004 |
| DE | 102 56 429 | 6/2004 |
| EP | 0 380 186 | 8/1990 |
| EP | 0 391 883 | 10/1990 |
| EP | 0 828 233 | 3/1998 |

(Continued)

OTHER PUBLICATIONS

International Search Report; PCT/EP2005/002387; May 23, 2005.

*Primary Examiner*—Stephen Yam
(74) *Attorney, Agent, or Firm*—Cantor Colburn LLP

(57) ABSTRACT

A control device or a method monitors access of at least one body or one person to an access area, the device comprising at least one emitting element that emits light radiation into the access area, at least one receiving element that receives the light radiation, and at least one means which generates a diffused light field that emits the light radiation, which is emitted into the access area, in the form of a planar light field, where on the receive side, a detection element for the diffused detection of the light field and a transferring means for transferring the light detected in a diffused manner to the receiving element are provided.

26 Claims, 11 Drawing Sheets

FOREIGN PATENT DOCUMENTS

Figure 1:
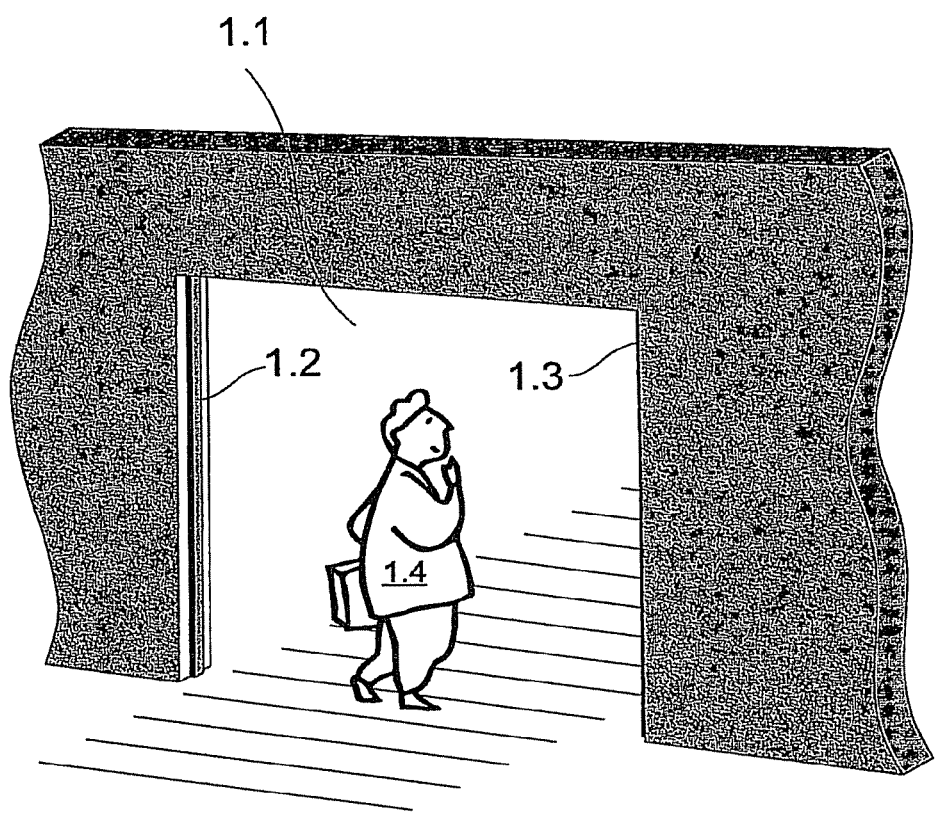

| | | |
|---|---|---|
| EP | 1 185 822 | 3/2002 |
| GB | 2 278 916 | 12/1994 |
| IT | 1291835 B1 * | 4/1997 |
| JP | 60 057210 | 4/1985 |
| NL | 9 101 819 | 5/1993 |
| WO | WO 03/030363 | 4/2003 |

* cited by examiner

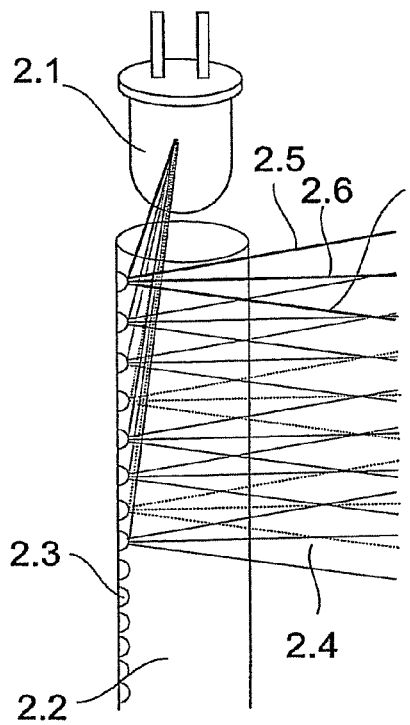
Fig. 2
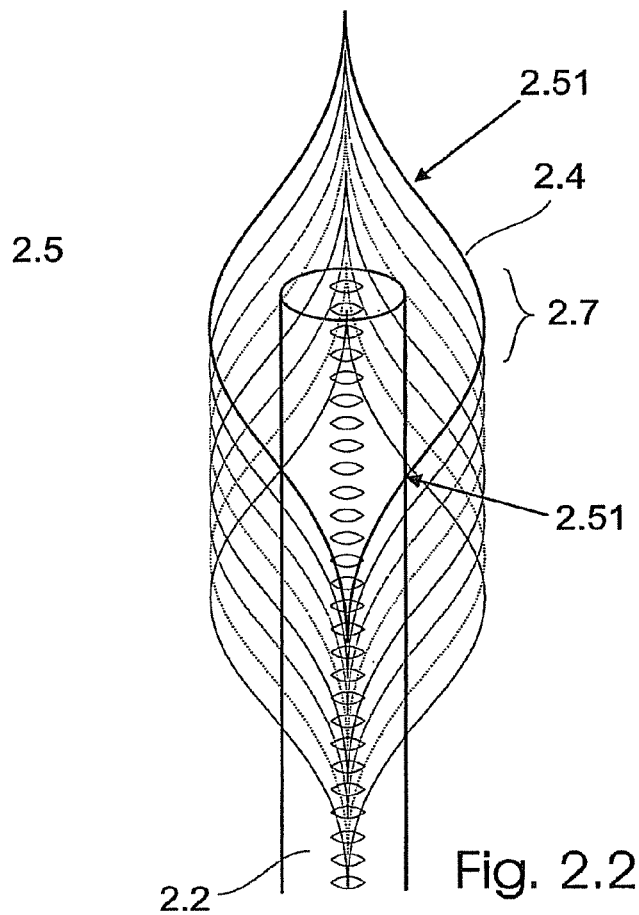
Fig. 2.2
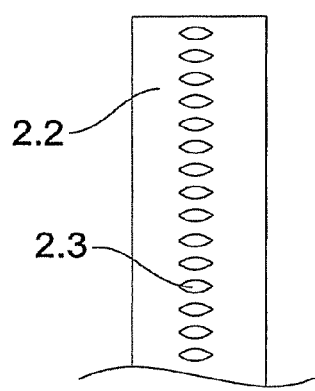
Fig. 2.1

ACCESS CONTROL DEVICE

REFERENCE TO RELATED APPLICATIONS

The present application claims the priority of the German patent application 10 2004 011 780.2 which was filed on Mar. 9, 2004 and whose content is hereby expressly incorporated in the subject matter of the present application.

FIELD OF THE INVENTION

The invention relates to a monitoring device for a space that is to be monitored for the entry of at least one body via an access area in accordance with the preamble of claim 1 as well as to a method for monitoring an access area in accordance with the preamble of claim 23.

BRIEF DESCRIPTION OF THE RELATED ART

Commercial light barriers are generally used for the purposes of monitoring a passage, e.g. an open door. These are arranged at a height above the floor that is tailored to the size of an average person, e.g. 80 cm. Consequently, a person moving in crawling manner whose highest point is then lower than 80 cm will no longer be registered. The same applies for a person who jumps over the light barrier.

In order to meet this problem, light barriers are placed at a plurality of heights, e.g. every 20 cm. Thus, in e.g. DE 101 46 639 A1, a light barrier system is proposed wherein the light is split up into a plurality of spatially separated partial beams which are fed through the path being monitored. In consequence, an optical lattice is produced through which a person cannot pass without being noticed. However, there is then a region between the light beams which remains free and through which e.g. a small object, e.g. an unpaid-for item or a weapon could be passed.

A very large number of light barriers, e.g. every 3 cm, substantially fulfils the demand for a gapless monitoring system, but this also leads to correspondingly high costs.

In addition, insects which fly through one of these light barriers or crawl over the outlet point or the inlet point of the light can also lead to false triggering.

A triangulation light grid comprising a plurality of optical lattices is known from DE 100 55 689 A1 wherein camera monitoring of a fan of light with line image sensors is effected in order to compensate for or detect the occurrence of errors using a differential imaging process.

A light mixing rod is proposed in DE 102 37 202 A1 which comprises luminescent diodes on the side faces thereof for the purposes of homogenizing a pencil of light rays whose radiation characteristic is directed toward the interior of the light mixing rod. Homogenized light fields are thereby produced.

A device for registering the position of an object is known from U.S. Pat. No. 3,758,197 A wherein a light field is beamed through the frosted surface of a light guide. At the receiving end, this light field is received and imaged via prisms. This leads to obliquely or angularly incident light remaining neglected, although this is immaterial for the application there which is that of monitoring the sag of a tape. In the field of passage monitoring however, this could lead to regions not being monitored.

An optical barrier is known from EP 1 185 822 B1 wherein light guides are provided by means of a dispersive strip along the side faces thereof in order to emit or receive light in a direction transverse to the longitudinal extent thereof.

Various opto-electronic devices for detecting the number of people crossing a passage are known from EP 0 828 233 A2. Here, one is working with reflective and absorptive measuring beams for an assumed average shoulder width of 40 to 50 cm in order to determine a meaningful maximum spacing for the different sensors or photo-electric receivers, as well as having a minimum spacing for the photo-electric receivers of 20 cm in order to prevent cross-talk between the different receiving paths.

Figure 8:
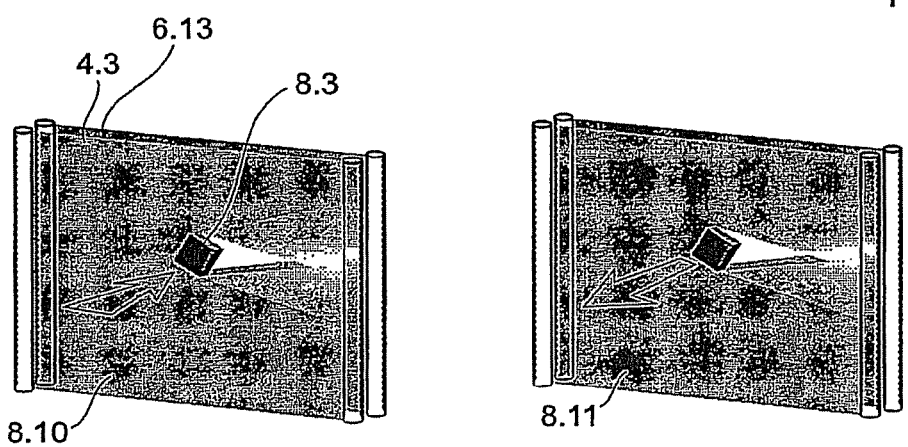
Figure 8:
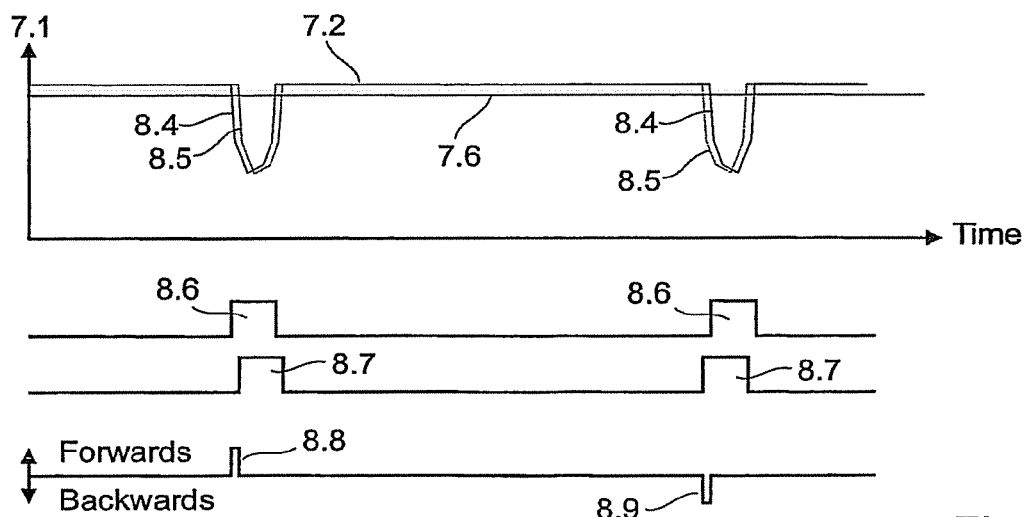

Directional detection of the direction of motion of the passers-by is effected by an arrangement of different beam fields in the longitudinal direction of the passage which is to be passed through and monitored. The different systems either work with light beams outgoing from the ceiling at different vertical angles and/or directed vertically downwardly (FIGS. 1; 2A, 2B; 7A, 7B; 24A, 24B) or possibly fan-like (FIGS. 16A, 16B; 19A, 19B; 20A; 20B), or with horizontal light beams which are parallel and spaced from one another and preferably cross the passage at right angles to the direction of motion of the passers-by (FIGS. 8, 9A, 9B; 13, 14A, 14B). The assumed shoulder width is drawn upon as the determining feature. The light beams do not intersect one another in the passage itself or not at the height of the passers-by.

An arrangement consisting of at least two light emitting diodes is known from WO 03/030363 A1 wherein the diodes are effective alternately on a photo-electric receiver. The light which is regulated in amplitude in at least one light path together with the light from a further source of light is effective on the photo-electric receiver in such a way that a received signal without clock-synchronous signal components is obtained. The signal received in the photo-electric receiver is supplied to a synchronous demodulator which then divides the received signal into the two signal components corresponding to the sources of light. After low-pass filtering, the two signal components are compared with one another in a comparator. If signal differences arise, these are regulated out to zero by means of a process of adjusting the power of at least one of the sources of light.

Moreover, there is often a requirement for the direction of movement to be determined and for singling-out persons crossing at the same time.

BRIEF SUMMARY OF THE INVENTION

On the basis of this state of the art, the invention provides a monitoring device which monitors an access area in as complete and preferably gapless manner as possible.

In contrast to the previously known monitoring devices based on the light barrier principle, a planar diffuse light field is now produced, this also being diffusely received. In consequence, even the smallest of objects can be registered although on the other hand, due to the planar coverage, it is also possible for objects to be registered only when above a certain threshold value so that an insect too will not lead to a false alarm, but appropriate monitoring even for small objects is still possible nevertheless.

If necessary, the system in accordance with the invention needs just a single photodiode as well as possibly a compensating LED and a light emitting LED for monitoring a door area of e.g. 2×2 m, whereas in conventional systems a receiver in the form of a photodiode and a transmitter in the form of a source of light is used for each of the requisite individual light barriers.

Preferably, the direction of motion of a body moving through the access area can be determined on the one hand, but in addition, discrepancies in regard to the passage of people can be determined by deliberately monitoring the torso and the lower body parts of the persons.

Moreover, should this be required, it is also possible to single-out from a number of bodies crossing the access area at the same time and to undertake special control measures in dependence on the results determined thereby.

Further advantages are the fact that the arrangement can be used in an external area due to the complete insensitivity thereof with respect to stray light and insects too. Other advantages will become apparent from the following description and the further dependent Claims.

SHORT DESCRIPTION OF THE FIGURES

Figure 3:
Figure 4:
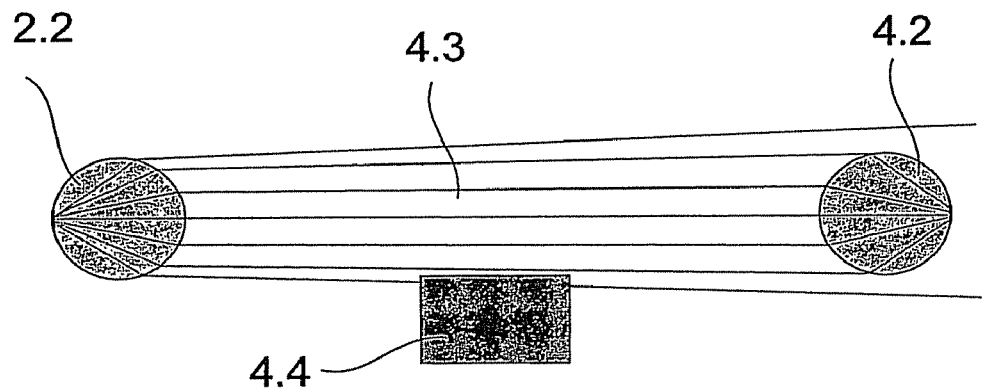
Figure 5:
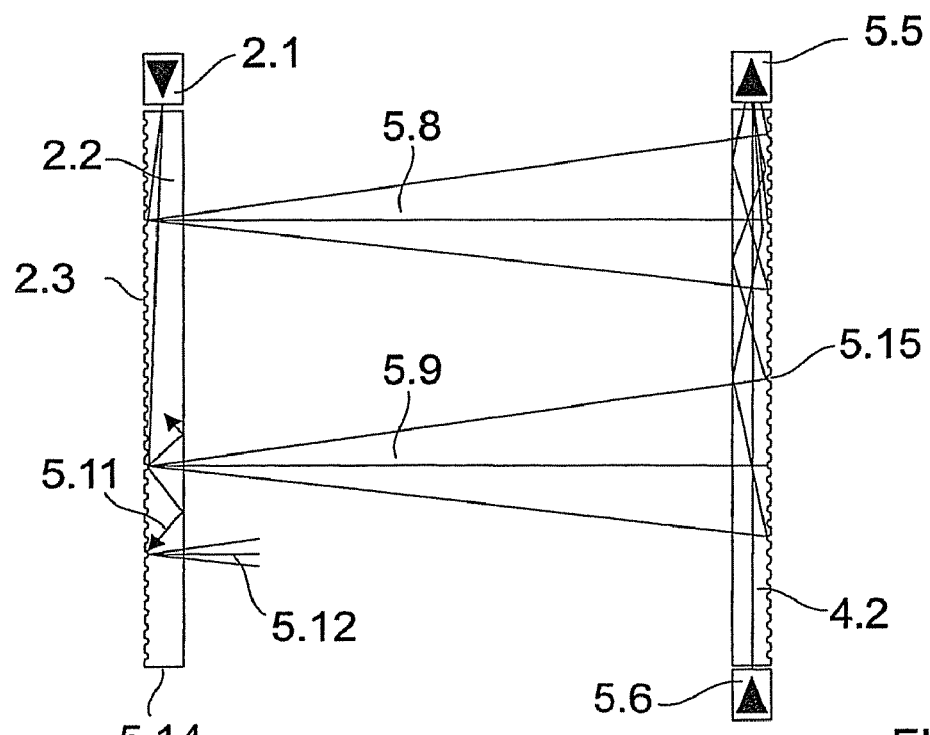
Figure 6:
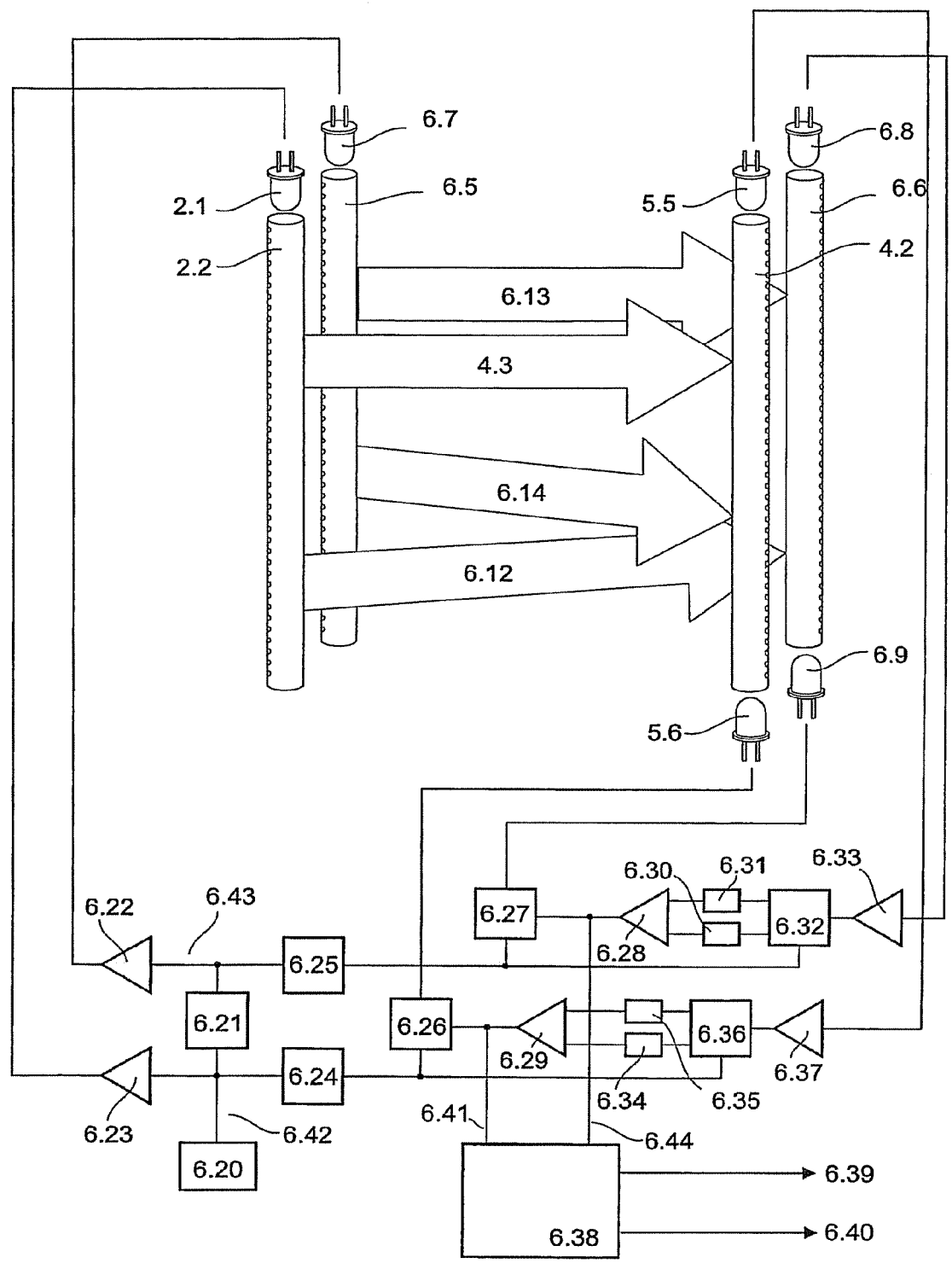
Figure 7:
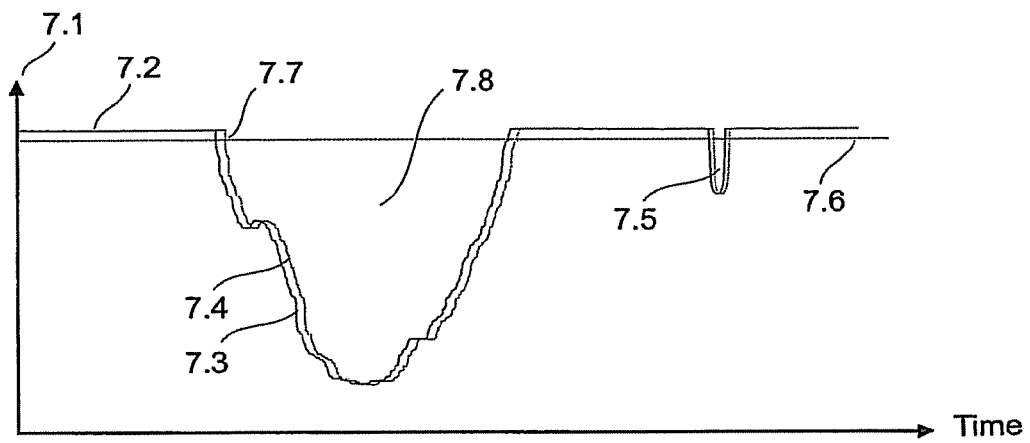
Figure 9:
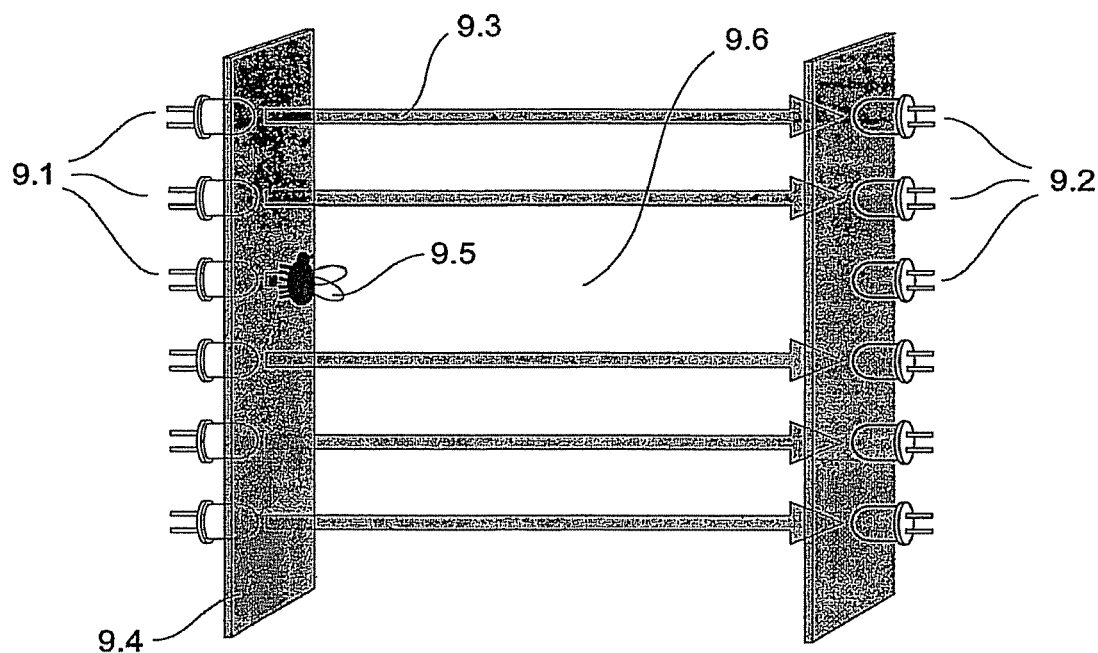
Figure 10:
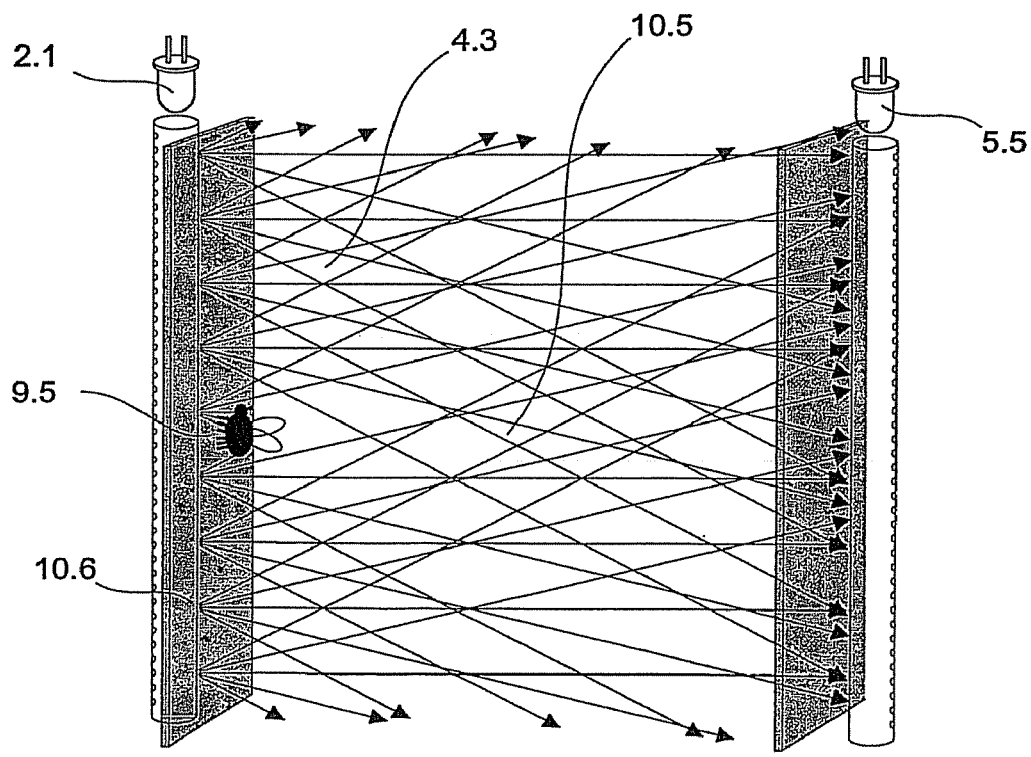
Figure 11:
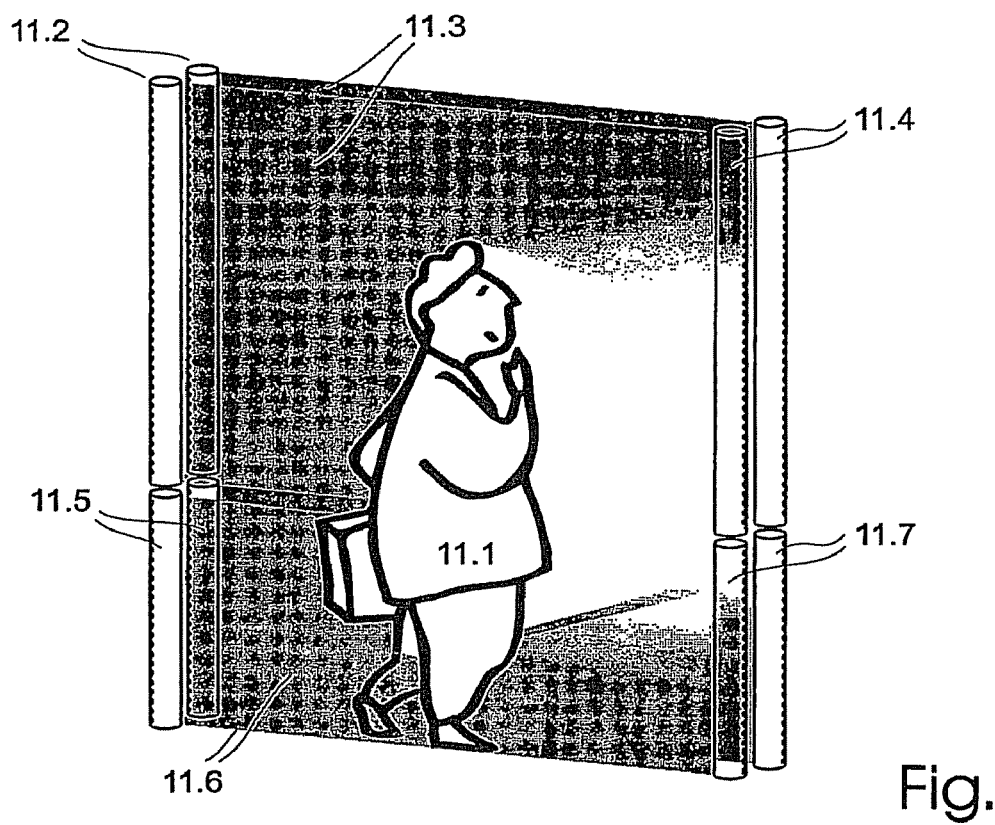
Figure 12:
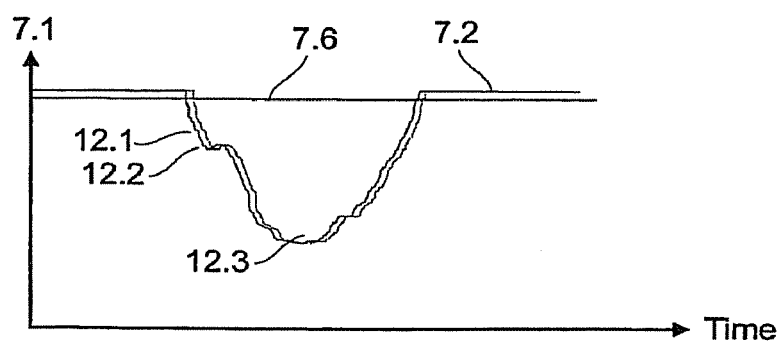
Figure 13:
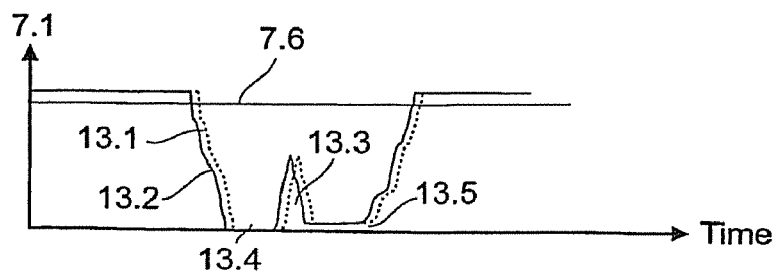
Figure 13A:
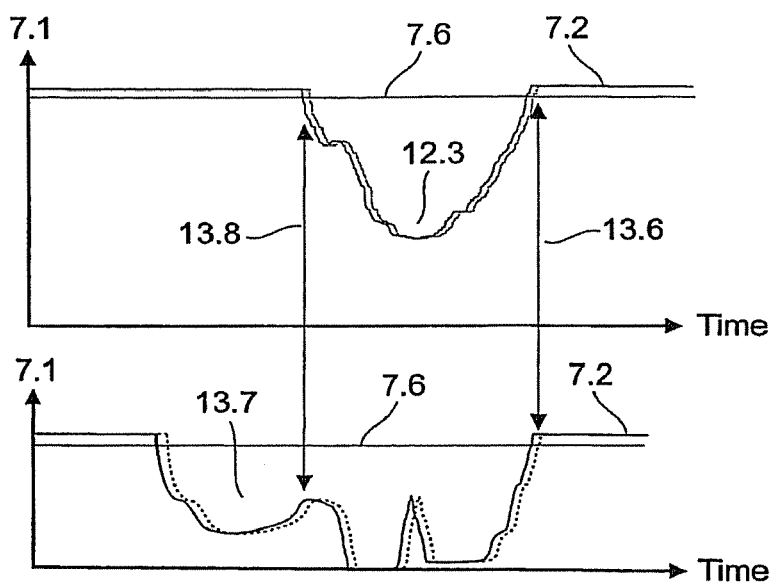
Figure 14:
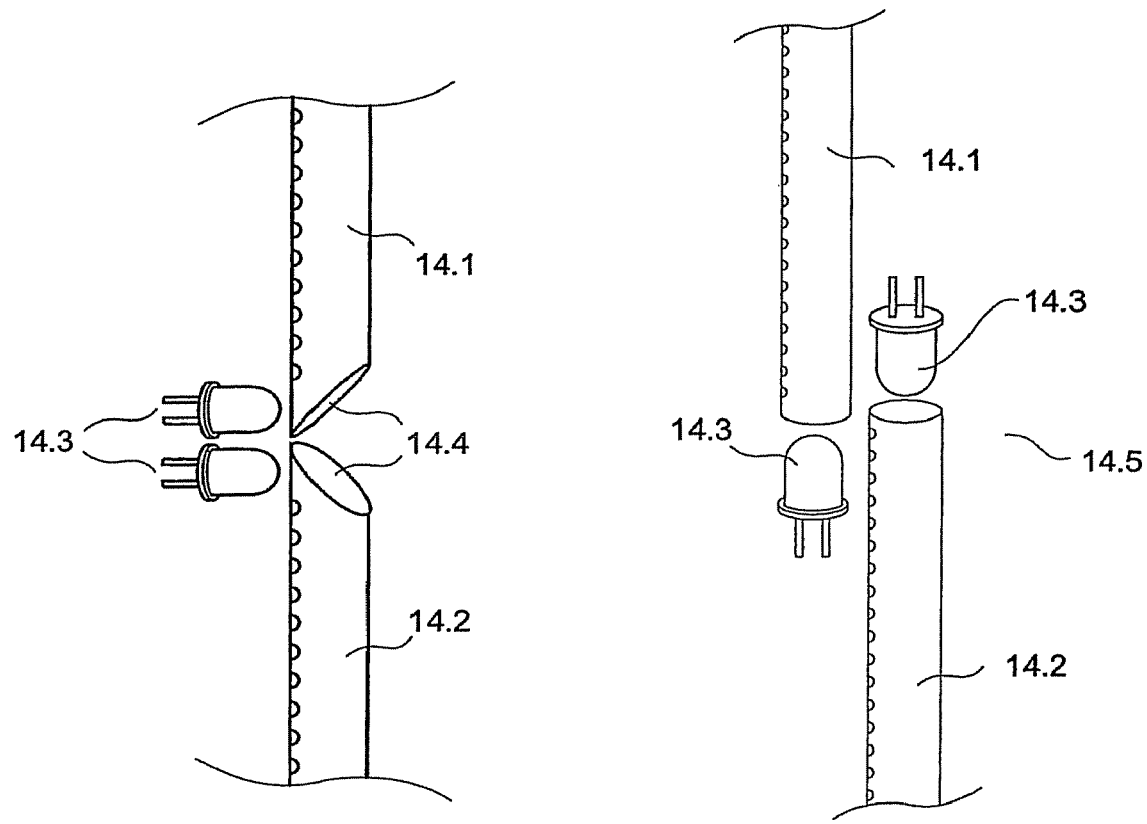
Figure 15:
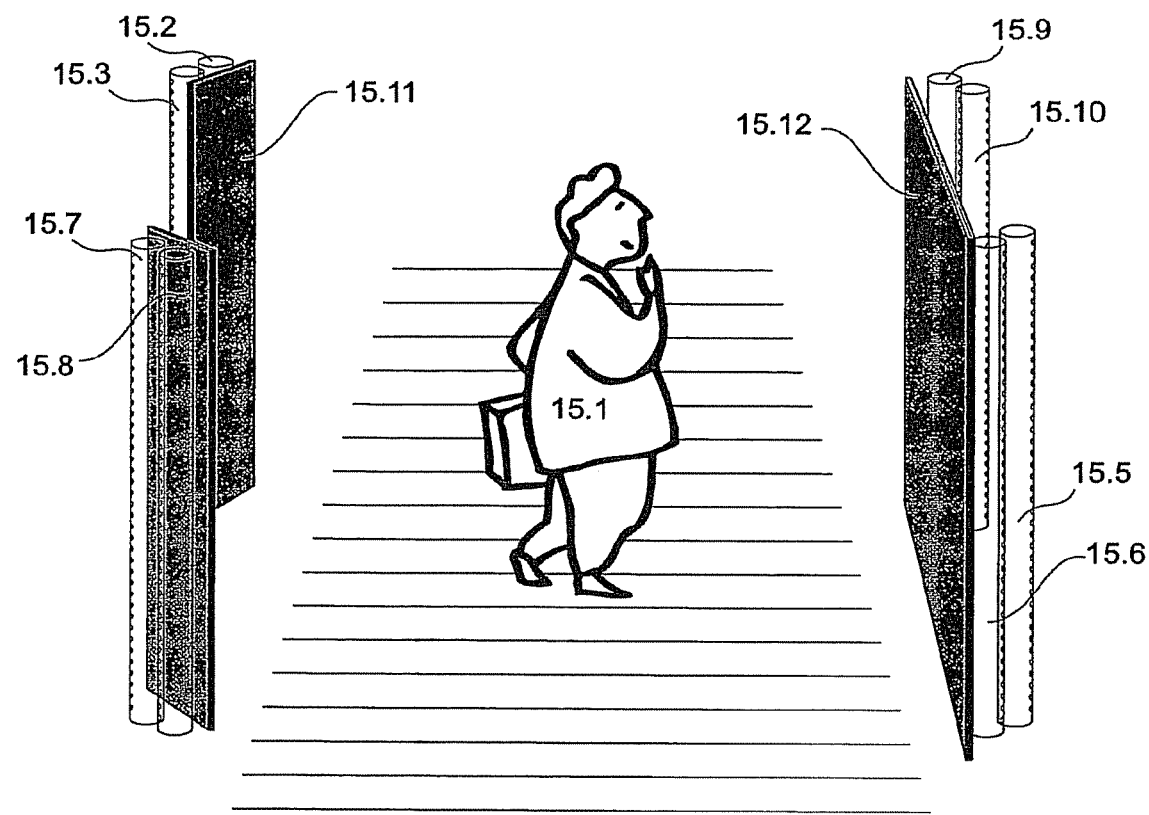
Figure 16:
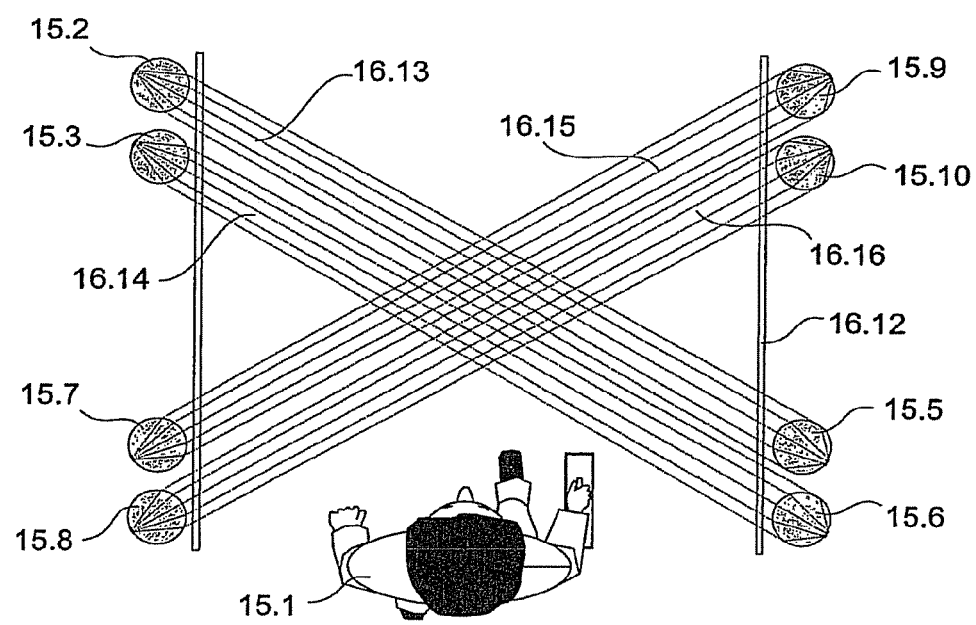
Figure 17:
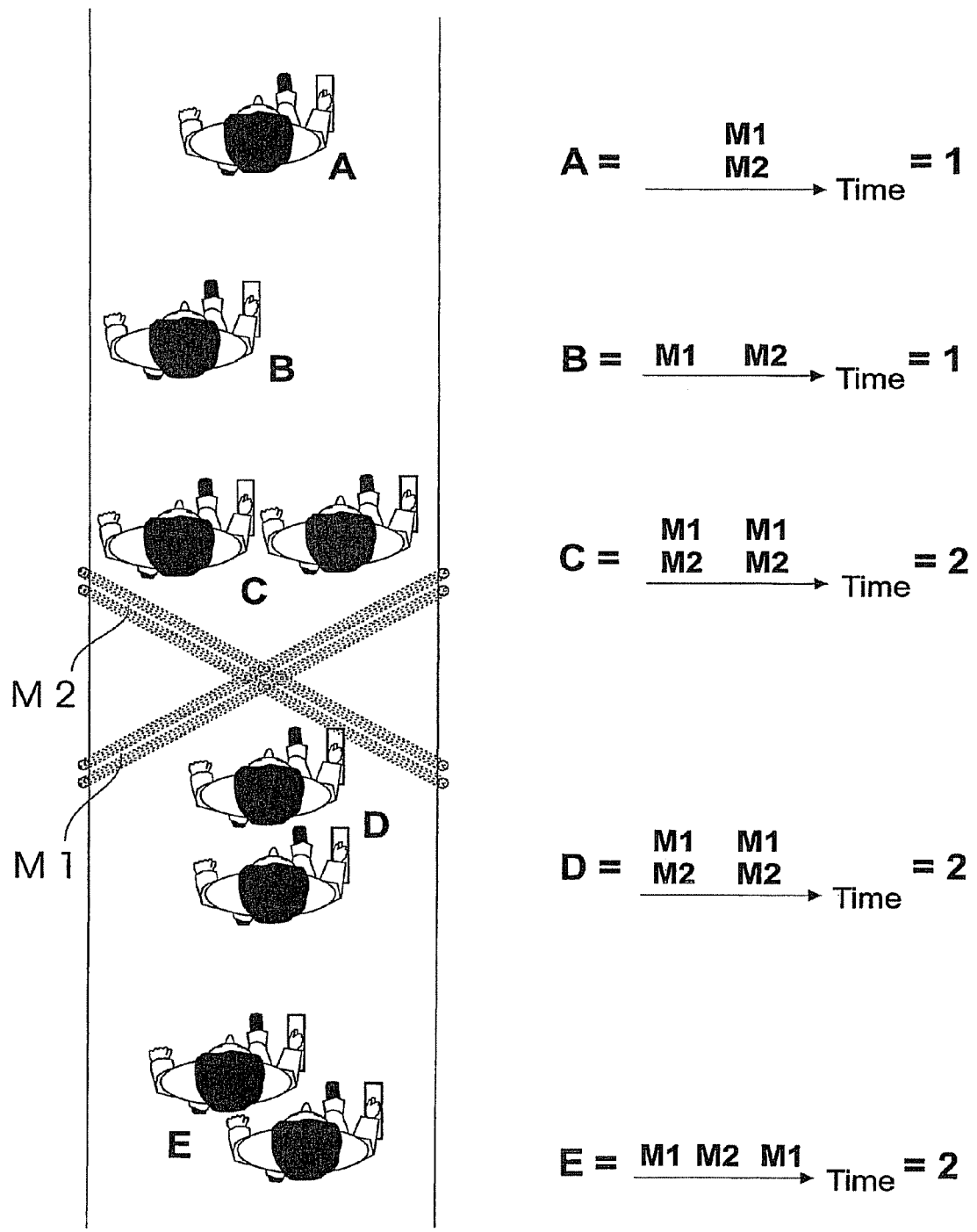
Figure 18:
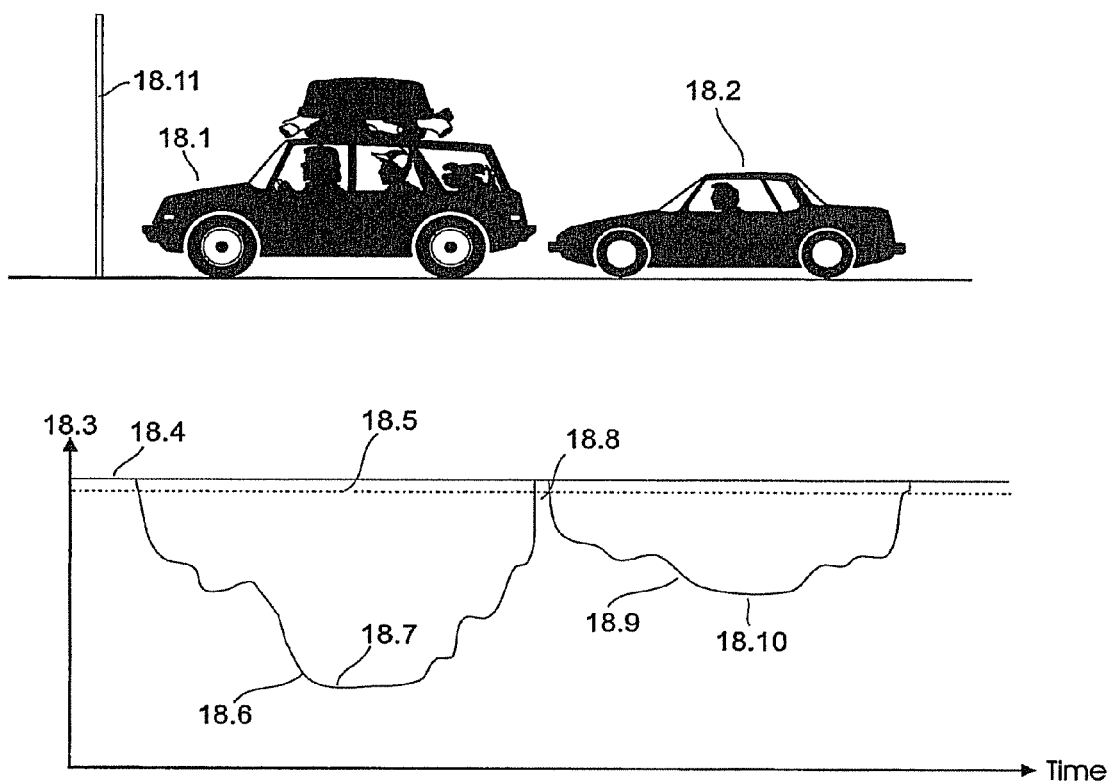

The invention is described in more detail hereinafter with the aid of the exemplary embodiments illustrated in the accompanying Figures. Therein:

FIG. 1 shows a schematic illustration of a passage monitoring system in an arbitrary wall without direction detecting facilities, FIG. 2 a schematic arrangement of the light guide elements, FIG. 2.1 a view of a light guide element, FIG. 2.2 the optical pattern emitted by the light guide element as seen by the receiver, FIG. 3 examples of other possible forms of a light guide element, FIGS. 4, 5 the beam path between an emitting light guide and a receiving light guide in the form of a plan view and a front view, FIG. 6 a mechanical arrangement of two light guide systems for direction detecting purposes and the appertaining signal processing arrangement, FIG. 7 the signal waveform of the controlled variables 6.44 and 6.41 in the event of movement e.g. of a person and of a small object through the light fields 4.3 and 6.13, FIG. 8 the signal waveform of the total luminous power and the digitized signal obtained therefrom when an object is thrown through the light fields in different directions, FIG. 9 a conventional light barrier system, FIG. 10 a schematic illustration of the light beams in a passage monitoring system in accordance with the invention, FIG. 11 a passage monitoring system for detecting the number of people which comprises pairs of light fields arranged one above the other, FIGS. 12, 13 the signal waveform of the pairs of light fields in accordance with FIG. 11 during the passage of a person, FIG. 13*a* an illustration in accordance with FIGS. 12 and 13 for the passage of a second person within the lower range, FIG. 14 the transitional region between the pairs of lights in accordance with FIG. 11, FIGS. 15, 16 a view of the arrangement of the light fields for singling-out persons and a plan view thereof, FIG. 17 the passage of different people or groups of people through a system for singling-out persons in accordance with FIGS. 15, 16 and the results derived therefrom, FIG. 18 an example of the monitoring of a vehicle barrier.

DETAILED DESCRIPTION OF PREFERRED EXEMPLARY EMBODIMENTS

The invention will now be described in exemplary manner in more detail with reference to the attached drawings. Nevertheless, the exemplary embodiments are merely examples which are not intended to limit the inventive concept to a specific arrangement.

The Figures show a monitoring device for a space that is to be monitored for the entry of at least one body 1.4 via an access area 1.1. Entrances of this type can be of any arbitrary design and it needs not relate thereby merely to the entry of people. Thus for example, the monitoring of objects such as e.g. of vehicles in the exemplary embodiment of FIG. 18 is also possible. Likewise, a region can be monitored as to whether something is projecting into the region or whether something is about to intervene in a region. Conceivable fields of use are e.g. the monitoring of machines in regard to unauthorized access or interference e.g. for the purposes of industrial safety or accident prevention and the like. In principle then, it concerns monitoring any arbitrary access area to any arbitrary space.

The monitoring device for the access area is equipped with at least one emitting element which emits luminous radiation into the access area and at least one receiving element which receives the luminous radiation. In the exemplary embodiment, a light emitting LED 2.1 and a receiver in the form of a photodiode 6.8 are used for this purpose, these also being supplemented if necessary by a compensating LED 5.6, although in principle however a plurality of emitting elements and receiving elements could also be provided. For the purposes of achieving the desired monitoring performance, means are provided for producing a light field, said means developing the luminous radiation emitted into the access area 1.1 in the form of a planar light field 4.3, 6.13. The means for producing this light field are preferably arranged on a light guide element in such a way that the radiated luminous radiation is at least partially radiated with a radial and an axial component in regard to the light guide. This principle is described in more detail hereinafter with the aid of a plurality of exemplary embodiments.

FIG. 1 shows a simple passage monitoring system in an arbitrary wall without direction detection facilities. At least one respective light guide element 1.2 and 1.3 each comprising at least a single emitting element e.g. a light emitting diode for radiating into the access area and at least one receiving element e.g. a photodiode for receiving the emitted light is placed on both sides of the access area 1.1. If necessary, just a single one of each of the aforementioned elements can be used. To this end, the light is emitted by the light guide element 1.2 in the approximate direction of the second light guide element 1.3 and is received thereby. Any modulated luminous power of arbitrary wavelength can be used as the light, e.g. non visible IR light having a wavelength of 880 nm. The modulating frequency can be selected at will, but for the purpose of detecting the direction of fast moving objects as high a frequency as possible, e.g. 300 kHz, is selected.

A continuous light field is produced by means of the light guide elements 1.2 and 1.3 for the purposes of monitoring the access area 1.1. FIG. 2 shows the arrangement of the light guide elements. For the production of the light field, the light from a light emitting diode 2.1 is preferably sent into an emitting light guide 2.2. This may be an e.g. round Plexiglas rod. On one side of the light guide, there is a reflective structure 2.3 which preferably scatters the irradiated light towards the receiving element at the other side of the passage. The reflective structure is introduced into the surface in accordance with FIG. 2.1 as a structure e.g. by lasers; injection molding or milling. The reflective structure is preferably a lasered structure consisting of small lasered points having rounded indentations which radiates light in all directions. The light is thereby broken in the longitudinal direction of the light guide. The radiated light 2.4 from the laser structures overlaps in such a way that it is effective as an optical pattern. This is seen from the receiver end in FIG. 2.2.

In the case of a round light guide, the radiation coming perpendicularly from the light guide is not focused perfectly on the receiving light guide. The optimal focal point lies outside the diameter of a round Plexiglas rod. This is advantageous however in order to counteract manufacturing tolerances. The light beams expand towards the receiving light guide in the region of the perpendicular light outlet 2.6. This is indicated in FIG. 2.2 by the light region 2.7. By contrast, obliquely radiated light beams 2.5 are focused relatively perfectly on the receiving light guide within a limited region 2.51. The light guide needs not necessarily have a round shape. FIG. 3 shows examples of further possible shapes.

In order to produce a uniform light field, parts of the reflective structure 2.3 can be arranged less closely in the proximity of the emitting element than in a region of the light guide element more remote from the emitting element. The luminance is greater in the proximity of the emitting element so that more light is refracted outwardly at the reflective structure there. If one gradually raises the reflective structure with increasing distance from the emitting element, e.g. even just the thickness of a line forming the reflective structure, the light still arriving there can be increasingly refracted outwardly.

FIG. 4 shows the beam path 4.3 between an emitting light guide 2.2 and a receiving light guide 4.2 from above, these being of identical construction in the exemplary embodiment. Since one is not concerned here with mutually distinguishable light pencils or light paths, one could also speak of a homogeneous light field 4.3. An object 4.4 that is brought into the proximity of the beam path does not affect the path as long as it does not directly enter the direct beam path between the transmitter and the receiver.

FIG. 5 shows the beam path between the emitting light guide 2.2 and the receiving light guide 4.2 from the front. The modulated light from the light emitting LED 2.1 is scattered at the reflective structure 2.3 in the light guide in such a way that a light component 5.8 and 5.9 of the radiation is emitted in the direction of the receiving light guide 4.2. The reflective structure of the light guide is formed in such a way that the same luminous power is preferably emitted at every position, e.g. 5.8 and 5.9. In the simplest case, the necessary light gradient can be achieved by means of the mutual spacing of the reflective structures 2.3 (FIG. 2, 2.3). The light components 5.11 which are scattered into the light guide within the angle of total reflection remain therein until such time as they meet the reflective structure 2.3 at another arbitrary point and are then scattered again. These scattered light components 5.12 also contribute to the light gradient of the emitting light guide 2.2. If the end 5.14 of the light guide is mirrored, the light incident on the end can be reflected back and continue to be used. In addition, a further LED, which preferably sends at the same clock rate as the light emitting LED 2.1, can irradiate light here.

The receiving light guide 4.2 receives the light emitted by the emitting light guide 2.2. The incident light is focused on the reflective structure 5.15 and is at least partially guided away from there in a diffuse state to the photodiode 5.5. A further LED 5.6 can also be provided for the purposes of compensating the received modulated light signal to zero. This principle is known from the earlier German patent application DE 102 56 429.9. An extremely high sensitivity without the disturbing influences of stray light and signs of aging can thereby be achieved.

It is also advantageous to partially silver the light guide at the point where the further LED 5.6 is coupled-in so as to prevent unwanted exiting of the light from the light guide at this point. Hereby however, at least a portion of the luminous power of the further LED should be capable of being coupled into the receiving light guide 2.2.

When using such a system, one can of course determine whether a person or an object is affecting the region between the light guides, but one cannot however determine the direction from which the person or the object entered the light field 4.3. Nonetheless, it is frequently desirable for the direction of motion of the person or the object to be determined. This can be meaningful, e.g. if a person can depart from a secured region through a passage or door area in one direction, but no-one may enter the secured region unnoticed in the reverse direction. In this case too, an object may not be passed unnoticed into the secured region.

A mechanical arrangement consisting of two light guide systems for directional detection purposes is illustrated in FIG. 6. An emitting light guide 2.2 and a receiving light guide 4.2 together with the light emitting LED 2.1 and the photodiode 5.5 form a first light field 4.3. A further LED 5.6 can be provided for the purposes of compensating the received signal to zero. Light guide elements 6.5 and 6.6 together with the LED 6.7 and the photodiode 6.8 form a second light field 6.13. A further LED 6.9 can be provided for the purposes of compensating the received signal to zero.

The light emitting light guides do not necessarily have to be arranged on the same side. Thus, it is also possible for the light guide 6.5 to emit and the light guide 6.6 to receive the emitted light, whereas the emitting light guide 2.2 then serving as a receiving light guide in this case receives the light emitted by the receiving light guide 4.2 that is then serving as an emitting light guide. Naturally, in this case, the function of the light emitting LED 2.1 must also be associated with the receiving light guide 4.2 and in addition, the function of the photodiode 5.5 and the further LED 5.6 used for compensation purposes must be associated with the previous emitting light guide 2.2.

The spacing between the neighboring light guides e.g. the emitting light guide 2.2 and the light guide 6.5 can amount to e.g. a few millimeters, but could also amount to up to some centimeters. For reason of mechanical tolerance, one cannot exclude the possibility in the example of FIG. 6 that light 6.12 emitted by the emitting light guide 2.2 will also impinge on the receiving light guide 6.6. As a countermove, light 6.14 emitted by the light guide 6.5 can also impinge on the receiving light guide 4.2. In the event that there is a large spacing between the emitting light guide 2.2 and the light guide 6.5 on the one hand and the receiving light guide 4.2 and the light guide 6.6 on the other, both of the latter may possibly receive virtually equal amounts of light from the two emitting light guides. This can lead to unwanted interference. A sequential measurement of the two light fields is naturally possible, but has little to recommend it. In the case of rapidly moving objects, e.g. if an object is thrown through the light field, the direction could not be determined in an error free manner using a sequential measurement process in certain circumstances.

A signal processing system is described in FIG. 6 wherein two independent light fields can be operated mechanically adjacent to one another and electrically in parallel but without mutual interference.

As was described hereinabove, an arrangement of at least two light emitting diodes that are effective alternately on a photo-electric receiver is known from WO 03/030363 A1. The light controlled in amplitude in at least one light path together with the light from a further source of light are effective on the photo-electric receiver in such a way that a received signal without clock-synchronous signal components is obtained. The signal received in the photo-electric receiver is supplied to a synchronous demodulator which then divides the received signal into the two signal components corresponding to the sources of light. After low-pass filtering, the two signal components are compared with one another in a comparator. If signal differences arise, these are regulated out to zero by means of a process of adjusting the power of at least one of the sources of light. The same concept can also be used in the light guide arrangement for a passage monitoring system.

In the exemplary embodiment, a clock generator 6.20 supplies a first clock pulse signal at a frequency of e.g. 200 kHz. The driver stage 6.23 controls the light emitting LED 2.1 using this signal. The light from the light emitting LED 2.1 is supplied to the photodiode 5.5 by way of the emitting light guide 2.2, the light path 4.3 in the light field and the receiving light guide 4.2. For the purposes of compensating the clock pulse component in the photodiode to zero, a further LED 5.6 emits a signal which has been inverted in the inverting stage 6.24 and regulated in the power regulating stage 6.26 directly to the photodiode 5.5 e.g. via the receiving light guide 4.2.

The amplifier 6.37 amplifies the signal from the photodiode 5.5 accordingly and supplies it to the synchronous demodulator 6.36. In the exemplary embodiment, this demodulator receives the same clock pulse signal now serving as a demodulating clock pulse signal as the light emitting LED 2.1. The two signal components corresponding to the two sources of light, the light emitting LED 2.1 and the further LED 5.6 (compensation), are present separately at the output of the synchronous demodulator. After a low-pass filtering process in the filter stages 6.34 and 6.35, the two signal components are compared with one another in the comparator 6.29. If signal differences in the clock pulse sections for the light emitting LED 2.1 and the further LED 5.6 arise, then these are compensated to zero by means of a process of adjusting the power of the compensation light source, here, in the form of the further LED 5.6 in the power regulating stage 6.26. The controlled variable 6.41 for the power regulating stage 6.26 is supplied to the evaluating unit 6.38.

When using this arrangement, only the appearance or the presence of a person or an object in the region of the light field between the emitting light guide 2.2 and the receiving light guide 4.2 can be detected. For the purposes of realizing the second light field, the first clock pulse signal 6.42 is now converted into a second clock pulse signal 6.43. To this end, a divider having a division ratio of 1:2 suffices in the simplest case. The second clock pulse signal 6.43 could also be obtained from the first clock pulse signal 6.42 by a phase shifting process through 90 degrees. In other respects, the clock pulse signal can be a rectangular or a sinusoidal signal.

The important thing hereby is that the light being emitted in the first light field 4.3 cannot create interference in the second light field 6.13 due to inevitable cross-talk from the light 6.12 being emitted to the receiving element in the form of the photodiode 6.8 of the second light field. The same applies for cross-talk between the light 6.14 being emitted in the second light field 6.13 and the light in the first light field 4.3.

The signal processing of the second light field 6.13 occurs in an equivalent manner to the signal processing of the first light field 4.3. The first clock pulse 6.42 is divided down in the divider 6.21 e.g. from 200 kHz to 100 kHz. The driver stage 6.22 controls the LED 6.7 with this signal.

The light from the LED 6.7 is supplied to the photodiode 6.8 by way of the light guide 6.5, the light path 6.13 in the light field and the light guide 6.6. For the purposes of compensating the clock pulse component in the photodiode to zero, a second LED 6.9 emits a signal which has been inverted in the inverting stage 6.25 and regulated in the power regulating stage 6.27 directly to the photodiode 6.8 through the light guide 6.6.

The amplifier 6.33 amplifies the signal from the photodiode 6.8 accordingly and supplies it to the synchronous demodulator 6.32. In the exemplary embodiment, this demodulator receives the same clock pulse signal now serving as a demodulation clock pulse signal as the light emitting LED 6.7. The two signal components corresponding to the two sources of light, the LED 6.7 and the second LED 6.9 (compensation), are present separately at the output of the synchronous demodulator. After a low-pass filtering process in the filter stages 6.31 and 6.30, the two signal components are compared with one another in the comparator 6.28. If signal differences in the clock pulse sections for the LED 6.7 and the second LED 6.9 arise, these are compensated to zero by means of a process of adjusting the power of the compensation light source, here in the form of the second LED 6.9 in the power regulating stage 6.27. The controlled variable 6.44 for the power regulating stage 6.27 is supplied to the evaluating unit 6.38.

Due to the doubling or halving of the clock frequency for the second light field 6.13, the transmission power of the second light field cannot exert an effect on the first light field 4.3 as a result of the synchronous demodulation process. Naturally, the same reasoning also applies in the reverse case.

In addition, this arrangement also has in toto the advantage that it is extremely insensitive to stray light. It is thereby possible to simultaneously use the light guides e.g. by means of the light emitting LED, as illuminating means, especially if the clock frequency is a frequency that is no longer perceptible to the human eye, or by introducing light into the light guide via a further, preferably non-clocked, source of light.

FIG. 7 shows the signal waveform of the controlled variables 6.44 and 6.41 in the event of movement of an e.g. person 7.8 and a small object 7.5 through the light field 4.3 and 6.13. The total luminous power 7.1 which is effective between the emitting light guide 2.2 and the receiving light guide 4.2, or between the light guides 6.5 and 6.6 is plotted along the ordinate.

The person initially encounters a first light field and partially interrupts it. In consequence, the luminous power in the receiver of the corresponding light field decreases. This is depicted by the signal waveform for the luminous power transmitted in the light field, represented here by the signal waveform 7.3. A short time later, the person encounters the second light field and also partially interrupts this one (7.4). The time elapsing between the person entering the light fields depends on the distance between the light fields and the speed at which the person is moving. In general, it amount to a few milliseconds. If so desired, one can thus also determine the speed of the person with the help of this time difference.

The chief characteristic of the invention described, is a high, possibly virtually 100% identity of the signal waveforms 7.4 and 7.3 in the event of a movement of a person or an object through the light fields 4.3 and 6.13. This is particularly important if a small part of the body e.g. an outstretched finger initially enters the light fields. When using individual light barriers in conventional systems, a small obliquely moving object, a finger for example, could possibly pass "unseen" past the first front light barrier and just encounter the second light barrier behind it. The directional detection process in such a light barrier system is therefore just insufficient. Due to the virtually 100% identity of the signal waveforms 7.4 and 7.3 in the system described here however, an error free directional detection process can be achieved in every case even for the entry of a small object at any arbitrary position.

To this end, a threshold value 7.6 close to the quiescent value 7.2 is set. The quiescent value 7.2 corresponds to the value of the controlled variables 6.41 and 6.44 in FIG. 6 when a person or an object is not affecting the light fields 4.3 and 6.13 in FIG. 6. If the light fields are affected by a person (7.8) or by an object—the signal waveforms 7.5 depict the reaction when a small ball is thrown through the light field—then, in accordance with the arrangement of the light fields, a first of the two values of the signal waveforms falls below the threshold value 7.6 shortly before the second value. The threshold value is predefined or predefinable. It may be a fixed threshold value, but preferably however, it is controlled dynamically i.e. in time-dependent manner in dependence upon the particular application of use and also in dependence on the surrounding conditions.

This process is illustrated somewhat more clearly in FIG. 8. Four light guides form a first light field 4.3 and a second light field 6.13. An object, a cube 8.3 in the example 8.10, is thrown through the light fields from the front. The light field 4.3 is affected first, a short time later, the light field 6.13. This process is reflected accordingly in the signal waveform of the controlled variables 6.41 and 6.44 in the form of the curve 8.4 and 8.5. Both signal waveforms fall below the threshold value 7.6 in a certain sequence and, after digitization, lead to the digital signals 8.6 and 8.7. These show a corresponding offset which leads, after an evaluating process, to a direction signal 8.8 for the forward direction. In the second example 8.11, the cube is thrown through the light fields from the rear, the signal waveforms 8.4 and 8.5, and, 8.6 and 8.7 exchange their position and a direction signal 8.9 for the backward direction thereby results.

For the purposes of monitoring a passage, it is often important that not only people be detected but also objects, if e.g. a person unwantedly hands or throws a small object e.g. a commodity that has not been paid for through any arbitrary part of the access area. In conventional systems in accord with FIG. 9, disturbances due to insects or contamination can easily arise thereby. In general, these systems are composed of a row of light emitting diodes 9.1 and a row of photodiodes 9.2 serving as individual light barriers 9.3. Lens systems are often provided in front of the transmitters and the receivers so as to obtain more exact focusing. Transmitters and receivers can also be placed behind a surface 9.4 which is translucent for the wavelength being used.

A problem arises if an insect 9.5 crawls on this surface and interrupts the light beam. This can lead to a false alarm. If, in place of the insect, there is contamination on the surface, then an intelligent evaluating system could of course ignore this interruption or weakening of the light beam after a given period of time, but then however, following the insect or the contamination, there then arises a non sensitive region 9.6 in the access area which is to be monitored. An object could now be passed-through unnoticed in this insensitive region.

This unsatisfactory state of affairs is now prevented by the fact that, in place of a few individual light barriers 9.3, the light from the light emitting diode 2.1 is emitted uniformly in a light field 4.3 and is received as a whole by the photodiode 5.5. An insect 9.5 shades this light field merely by the volumetric shadow thereof, i.e. by only a very small amount in relation to the total surface area. It is irrelevant as to the position at which the insect enters the light field, there will only be a small change in the value of the controlled variable 6.41 or 6.44 (FIG. 6). Consequently, by means of an appropriate choice of the threshold value 7.6 (FIG. 7), an insect at any arbitrary position in the light field 4.3 or 6.13 will not lead to a false alarm.

The diffuse radiation along the longitudinal axis from all the reflection points in the light guide is also advantageous. Only a few are illustrated in FIG. 10, but there could be up to a plurality of thousands in a light guide having a lasered reflective structure. By using a white strip as the reflective element, the number of reflection points can be regarded as being virtually infinite. In consequence, the reflection points above and below the insect or the contamination 9.5 (FIG. 10) continue to radiate transversely past the insect and thus continue to fill the region behind this malfunctioning position with light. Thus, there will be no or at least only a very small non sensitive region in the light field 4.3.

If one single person is crossing the light field alone, the maximum shadowing effect is obtained when the head as being the highest point of the person affects the light field and one or both of his legs are in the light field at the same time. If, perchance, the person should stand in such a manner that one leg is at least partially in front and one leg is behind the light field, then the shadowing effect is reduced and the system could misinterpret the number of people being detected. This can be prevented if, as shown in FIG. 11, the light field is or the light fields are subdivided into two independent ranges. The lower range comprising the pair of emitting light guides 11.5 and the pair of receiving light guides 11.7 forms the pair of light fields 11.6. They extend up to e.g. approx. 100 cm high and cover the foot/leg portion of a person 11.1 crossing. The upper range, formed by the pair of emitting light guides 11.2 and the pair of receiving light guides 11.4, forms a pair of light fields 11.3 with the aid of which the region above the 100 cm mark up to the upper boundary of the passage is covered. The foot and the torso regions are registered separately with this arrangement. Both ranges are used for the purposes of giving an alarm, but substantially only the upper range is used for singling-out purposes.

FIG. 12 depicts the light shadowing effect produced by a torso in the pair of light fields 11.3 in the form of the signal waveforms 12.1 and the 12.2 corresponding to the controlled variables 6.41 and 6.44. In the course of the passage of the highest portion of the body through the pair of light fields 11.3, the head of the person in the exemplary case, there ensues an unambiguous minimum 12.3 of the signals 12.1 and 12.2. Similarly, FIG. 13 depicts the related light shadowing effect of the legs and the lower part of the body in the lower pair of light fields 11.6. When crossing the lower pair of light fields 11.6, a region of total shadow 13.4 of the light fields 11.6 can occur if one foot is placed on the ground in the region of the light field, whereas partial shadowing 13.5 would occur during the movement of a raised foot since light still penetrates below the raised foot. A lesser amount of light is shaded in the region between the legs so that a signal increase 13.3 will occur. Since the habitual manner of movement of a person is not foreseeable, nothing can be deduced from the signal waveforms in the lower pair of light fields 11.6 in regard to the number of people. However, there is a temporal correlation between the points at which the signals fall below the threshold values 7.6 in the course of the passage of one single person through the pairs of light fields 11.3 and 11.6.

If, now, a dog or a second person tries to penetrate unnoticed into the region which is to be monitored by moving beside the first person with ducked head only through the light fields 11.6, then, in accordance with FIG. 13a, it or he disrupts the temporal correlation 13.8 between the points at which the two signal waveforms for the pairs of light fields 11.3 and 11.6 fall below or exceed the threshold values 7.6. The signal waveform 12.3 in the pair of light fields 11.3 shows the passage of the torso of a first person. At the time point 13.8, this first person has left the light field 11.3, the threshold value 7.6 is exceeded again and the signal adopts the quiescent value 7.2.

Now approximately at this time point, the signal waveform for the light field 11.6 should also exceed the threshold value 7.6 again. FIG. 13*a* shows however, that the threshold value 7.6 only exceeds the threshold value 7.6 after a further period of time 13.7. In this circumstance, it can now be concluded that a dog or a second person wanted to sneak unnoticed through the passage monitoring system by creeping behind the first person. In this case, e.g. a camera can be switched-on or an alarm activated. This can be established separately for each light field if necessary with the aid of detection means and comparison means such as are exemplarily described especially in FIG. 6.

In some circumstances, it is important that the transitional area between the pairs of light fields 11.3 and 11.6 should not comprise an insensitive transitional area. This can be achieved in accordance with FIG. 14 in that the light guides, illustrated here by the example of two light guides 14.1 and 14.2, comprise e.g. a reflective surface 14.4 so that the light emitting diodes 14.3 can be placed behind the light guides. Or, the light guides 14.1 and 14.2 are arranged next to one another without any spacing in the longitudinal direction (14.5).

With the aid of the arrangement described thus far, people or objects which pass the light field can be detected. Hereby, the magnitude of the shadowing effect and the direction of the movement can be measured in stepless manner. Furthermore, the speed of the movement can also be measured and a conclusion can be indirectly drawn in regard to the magnitude of the object or the extent of the person by measuring the temporal length of the shadowing effect in relation to the speed. This is important in order to recognize an e.g. person or an object which is being conveyed "hidden" e.g. under the coat of a second person and which together only form a single maximum 12.3 of the shadow.

In many cases one wants to know whether it is just one person going alone through the pair of light fields, or whether two people are going together e.g. shoulder to shoulder through the pair of light fields. Turnstiles should only ever let through one person alone. Hereby however, one cannot exclude the possibility that a second person is also squeezing through without permission. The goal is now to recognize e.g. in the case of such a turnstile, as to whether more than one person has moved through it.

It is also possible that there is a need to recognize whether the person being detected reverses his path and thus moves without permission in the wrong direction. To this end, two neighboring individual light fields are employed in the arrangement for singling-out persons that is now to be described. Thus, beside the number of people, the direction of motion thereof can also be detected.

The arrangement described thus far can only recognize two people separately if they go one behind the other. When they are next to one another, two people result in the same shadow effect as an individual so that a process for singling them out cannot be effected here. For the purposes of registering the number of people going along next to one another, two crossed light fields are preferably employed in the exemplary embodiment. For the purposes of registering the direction of motion, each light field consists of two individual light fields.

FIG. 15 shows the arrangement of the light fields. A translucent screen 15.11 can be provided in front of the light guides so as to shield the light guide. Naturally, this screen could also be in the form of a continuous surface 15.12 arranged in parallel with the path of movement of the people and consist of e.g. a synthetic material which is IR transparent, but which appears to be e.g. black to the human eye. In consequence, the detection system remains invisible for the person 15.1 crossing.

In the exemplary embodiment, the light guide 15.2 emits, whilst the light guide 15.5 receives the emitted light, and the two light guides together form a first light field 16.13. At the same time, the light guide 15.3 emits, whilst the light guide 15.6 receives the emitted light, and together these two light guides form a second light field 16.14. The frequency or phase of the emitted light signal in the first light field is selected in such a way that it does not interfere with the second light field or the corresponding electronic evaluating system. By means of appropriate optical filtering in the receiver path, two different wavelengths, e.g. 740 nm and 950 nm could also be used. Both light fields can then be operated at the same clock frequency or in the same phase without mutual interference.

Two further light fields now cross the first two light fields 16.13 and 16.14. To this end, light guide 15.7 emits, whilst light guide 15.9 receives the emitted light, and these two light guides together form a third light field 16.15. At the same time, the light guide 15.8 emits, whilst the light guide 15.10 receives, and together these two light guides form a fourth light field 16.16. Cross-talk between the light components can be prevented by appropriate spacing of the receiving light guide for the first pair of light fields 16.13 and 16.14 with respect to the receiving light guide for the second pair of light fields 16.15 and 16.16. This means that light components of the first pair of light fields do not penetrate into the receiving light guides of the second pair of light fields. In the exemplary embodiment, the light fields cross approximately at the half way point, although embodiments are also possible wherein the light fields cross at other places or do not even cross at all. The only important thing is that they be at an angle to one another. They could also be at different angles to the direction of motion of the body. Yet further light fields can also be arranged for increased security. Suitable angles are e.g. 80° and 100° relative to the direction of motion.

In the event of a small spacing of e.g. less than 30 cm between the receiving light guides for the first pair of light fields 16.13 and 16.14 and the receiving light guides for the second pair of light fields 16.15 and 16.16, there may be cross-talk of the light components due to tolerances. In this case, the function of the emitting light guides can be exchanged with the function of the receiving light guides for one pair of light fields. In the exemplary embodiment then, e.g. the light guides 15.9 and 15.10 of the emitting light guides and the light guides 15.7 and 15.8 of the receiving light guides.

For the sake of simplicity in the exemplary embodiment of FIG. 15, the subdivision into an upper and a lower range such as is illustrated in FIG. 11 was not taken into consideration. In principle, a combination of this type does not have to take place, albeit being of advantage for detecting the number of people. The signal waveforms described hereinafter apply to the upper range, i.e. for the detection of the torso.

If the person 15.1 passes through the light fields from bottom to top in FIG. 16, he will, in this exemplary embodiment, encounter the light fields 16.16 and 16.14 at approximately the same time and then the light fields 16.13 and 16.15 a short time later. The direction of motion can be registered using this arrangement, and a process for singling-out persons can also be carried out. If no importance is attached to the direction of motion, two light fields are sufficient, e.g. the light fields 16.13 and 16.15 in the exemplary embodiment of FIG. 16 i.e. a duplication of the light fields is dispensed with.

FIG. 17 shows the passage of different people or groups of people through such a system for singling-out persons and the results derived therefrom. For the sake of simplicity, the individual pairs of light fields were combined into the respective light field system M1 and M2. The people or groups of people A to E pass through the light field systems M1 and M2 from bottom to top. Hereby, they are at differing positions relative to the light field system M1/M2.

Person A goes centrally through the light field systems. He thereby affects M1 and M2 approximately contemporaneously, but each system M1 and M2 only registers a single maximum of the shadow effect. The result is "one" person.

Person B goes through the light field systems laterally of the centre. Hereby, M1 is affected first and then M2, again each light field system only registers a single maximum of the shadow effect. The result is "one" person.

The people C go through the light field systems in parallel. M1 and M2 each thereby simultaneously registers a maximum of the shadow effect twice. The result is "two" people.

The people D go through the light field systems directly behind one another. The same state thereby arises as for person A, but this time twice in succession. The light field systems M1 and M2 each register a maximum of the shadow effect twice. The result is "two" people.

The people E go through the light field systems laterally offset in such a manner that the person going on the left encounters the light field system M1 first, this leading to a first maximum of the shadowing effect. As they continue through, both people encounter the light field system M2 at the same time. However, they overlap in such a way that there is only a single maximum of the shadowing effect in the light field system M2. A short time later however, the person going on the right encounters the light field system M1 so that there is then a second maximum of the shadowing effect. The result is "two" people.

The following conclusions can be drawn therefrom:

If only one maximum shadow effect is registered in the light field systems M1 and M2, then there is only one person who is going through the light fields at any arbitrary point. If at least one of the light field systems registers at least two maxima of the shadow effect, then there must be two people who are going through the light fields M1 and M2 at an arbitrary position relative to one another.

Self evidently, the system can also be employed for singling-out vehicles or other moving objects. An example of a system for monitoring a vehicle barrier is illustrated In FIG. 18. For the purposes of monitoring a mechanical vehicle barrier, a process involving the detection of the metal content of the vehicle which works by means of induction coils let into the ground is generally used. These systems have a limited resolving power. In consequence, it can happen that two vehicles traveling directly one behind the other are detected as being a single vehicle. Crooks can use this effect in order to get through a mechanical barrier that is not illustrated in detail in FIG. 18 e.g. by driving a stolen vehicle 18.2 directly behind a regular vehicle 18.1.

In the example of FIG. 18, a light field 18.11 (as seen from the side) is arranged in the vicinity of the mechanical barrier. Each individual vehicle can be detected with the aid of the shadowing effect. The value 18.3 represents the signal waveform for the absorption in the light field 18.11. The line 18.4 stands for the signal magnitude without any shadowing effect. If the signal falls below the threshold value 18.5 then a vehicle has been detected. A conclusion in regard to the size or the shape of the vehicle can also be drawn with the aid of the signal waveform 18.6. The highest point of the vehicle is represented by the maximum of the shadow effect 18.7. At the point 18.8, the threshold value 18.5 has been exceeded again since this is where the rear end of the first vehicle 18.1 was. A short time later, the second vehicle 18.2 affects the light field 18.11 and produces a second shadow effect 18.9 with the maximum 18.10. Since the temporal length of the period for which the threshold value 18.8 was exceeded represents the distance between two vehicles at a certain speed that is measured in the light field system 18.11, a conclusion can be drawn in regard to the non permissible passage of a second vehicle. Then for example, the barrier can be closed or further measures can be introduced. By contrast, a vehicle and trailer will not be detected as being a non permissible passage since there exists between the vehicle and the trailer a connection which does not lead to the signal waveform 18.6/18.9 between the two maxima of the shadow effect (18.7 and 18.10) exceeding the threshold value 18.5 in the time period 18.8.

Self-evidently, a gas-discharge tube can also be employed as an emitting light guide, whereby the light gradient is then determined by further suitable measures. If it is permissible for the light from the emitting light guide to be visible, then a light guide without a further reflective structure could also be employed as a receiver at the receiving end. In place of the reflective structure, an e.g. fluorescent coloring material is added to the material of the light guide as a whole. This coloring material absorbs the light received from the emitting light guide in the light guide and radiates this light isotropically with a changed wavelength. The light radiated in this manner remains within the total reflection in the light guide and is guided without substantial absorption to the end of the light guide.

In the case of a light guide without fluorescent coloring material wherein the light received is focused on the reflective structure, only a part thereof can be scattered into the light guide in such a way that it is guided to the photodiode within the total reflection in the light guide. A substantial part of the light received will emerge from the light guide in virtually the same direction as the direction of entry and thus does not impinge on the photodiode. Furthermore, the light received can impinge the reflective structure again at any other arbitrary position within the light guide whilst on its way to the photodiode and can emerge at least partially from the light guide at such a position. Although much light is thus lost in this manner, an access area of 2×2 m can in practice be monitored with the aid of two commercial light emitting diodes and a photodiode and a light guide of 6 mm diameter with a sensitivity such that a conventional writing implement of 10 mm diameter can be securely detected even under more difficult conditions (direct sunlight, neon tubes etc.). The employment of a fluorescent coloring material in the receiving light guide does however increase the efficiency by about 3-5 times.

The fluorescent coloring material converts a shorter wavelength with a high degree of efficiency into a longer wavelength. If e.g. blue light is employed as the emitted light, the fluorescent coloring material converts this into green light. Green light being used as the emitted light is converted into red light in the fluorescent coloring material, a red emitted light into infrared light.

It is self-evident that this description can be subjected to the most diverse of modifications, changes and adjustments which fall within the sense of being equivalents to the attached Claims.

| List of reference symbols | |
|---|---|
| 1.1 | access area |
| 1.2 | light guide element |
| 1.3 | light guide element |
| 1.4 | body |
| 2.1 | light emitting LED |
| 2.2 | emitting light guide |
| 2.3 | reflective structure |
| 2.4 | radiated light |
| 2.5 | obliquely radiated light beams |
| 2.51 | light-beam region |
| 2.6 | perpendicular light outlet |
| 2.7 | light region |
| 4.2 | receiving light guide |
| 4.3 | light field |
| 4.4 | object |
| 5.5 | photodiode |
| 5.6 | further LED for compensation purposes |
| 5.8 | light component |
| 5.9 | light component |
| 5.11 | light components within the angle of total reflection |
| 5.12 | scattered light components |
| 5.14 | end of the light guide |
| 5.15 | reflective structure |
| 6.5 | light guide |
| 6.6 | light guide |
| 6.7 | LED |
| 6.8 | photodiode |
| 6.9 | second LED for compensation purposes |
| 6.12 | emitted light |
| 6.13 | second light field |
| 6.14 | emitted light |
| 6.20 | clock generator |
| 6.21 | divider |
| 6.22 | driver stage |
| 6.23 | driver stage |
| 6.24 | inverting stage |
| 6.25 | inverting stage |
| 6.26 | power regulating stage |
| 6.27 | power regulating stage |
| 6.28 | comparator |
| 6.29 | comparator |
| 6.30 | filter stage |
| 6.31 | filter stage |
| 6.32 | synchronous demodulator |
| 6.33 | amplifier |
| 6.34 | filter stage |
| 6.35 | filter stage |
| 6.36 | synchronous demodulator |
| 6.37 | amplifier |
| 6.38 | evaluating unit |
| 6.41 | controlled variable |
| 6.42 | first clock pulse |
| 6.43 | second clock pulse |
| 6.44 | controlled variable |
| 7.1 | total luminous power |
| 7.2 | quiescent value |
| 7.3 | signal waveform for transmitted luminous power |
| 7.4 | signal waveform for transmitted luminous power |
| 7.5 | small moving object |

The invention claimed is:

1. A monitoring device for a space that is to be monitored for entry of at least one body via an access area comprising:
a plurality of light field regions comprising a plurality of light fields, each of the light fields including:
at least one emitting element which introduces luminous radiation into the access area; and
at least one receiving element which receives the luminous radiation,
wherein at least one light guide is associated with the emitting element, said light guide emitting the luminous radiation into the access area as one of the plurality of light fields transversely to a longitudinal direction of the at least one light guide; and
wherein at a receiving end at least one light guide is provided as a detecting element for detecting the one of the plurality of light fields transversely to the longitudinal direction of the at least one light guide at the receiving end and as transmitting means for transmitting the light out of the light field to the receiving element,
wherein at least two light field regions arranged at an angle to one another cross within the access area, and
wherein each light field region comprises at least two light fields which are arranged one behind the other in a direction of motion of the body.

2. A monitoring device in accordance with claim 1, wherein the emitting light guide associated with the emitting element comprises a structure for radiating the light field.

3. A monitoring device in accordance with claim 2, wherein the structure is provided to be augmented with increasing distance from the emitting element.

4. A monitoring device in accordance with claim 1, wherein the receiving light guide associated with the receiving element comprises a structure for receiving the light field.

5. A monitoring device in accordance with claim 4, wherein the structure is provided to be augmented with increasing distance from the receiving element.

6. A monitoring device in accordance with claim 1, wherein a means for producing the light field are arranged in such a manner that the luminous radiation is radiated at least partially with a component that is radial and axial in regard to the light guide.

7. A monitoring device in accordance with claim 1, wherein for each light field there is provided a single emitting element, which irradiates light into the emitting light guide and a single receiver, which receives the light from the receiving light guide.

8. A monitoring device in accordance with claim 7, wherein the single emitting element is a light emitting LED and the single receiver is a photodiode.

9. A monitoring device in accordance with claim 1, further comprising an evaluating unit for evaluating shadowing of the light field in a direction of the receiving light guide that occurs upon entry or passage of a body into or through the light field.

10. A monitoring device in accordance with claim 1, wherein at least two light fields are provided which are evaluated separately by an evaluating unit and are arranged one behind the other in a direction of motion of the body.

11. A monitoring device in accordance with claim 10, wherein means for producing the light field including the at least one emitting element and the at least one receiving element, the emitting light guide and the receiving light guide for the two mutually parallel light fields are arranged next to one another.

12. A monitoring device in accordance with claim 1, wherein at least two light fields are provided which are subdivided into a plurality of partial light fields which are arranged one above the other and are evaluated separately by an evaluating unit.

13. A monitoring device in accordance with claim 1, further comprising a detection means which detects the entry or passage of a body as soon as a total luminous power falls below a predefined or predefinable threshold value.

14. A monitoring device in accordance with claim 1, wherein a timing waveform of a shadowing process corresponding to a reduction of a total luminous power reproduces a profile of the body crossing the access area.

15. A monitoring device in accordance with claim 1, wherein at least two mutually associated light fields are provided and wherein comparison means are provided for temporal correlation of one or both of a falling below a threshold value and a total luminous power of the mutually associated light fields.

16. A monitoring device in accordance with claim 1, wherein a counter is provided for determining bodies crossing the access area, said counter registering maximum values of a maximum shadowing effect detected by detection means for each body.

17. A monitoring device for a space that is to be monitored for entry of at least one body via an access area comprising:
 a plurality of light field regions comprising a plurality of light fields, each of the light fields including:
 at least one emitting element which introduces luminous radiation into the access area; and at least one receiving element which receives the luminous radiation, wherein at least one light guide is associated with the emitting element, said light guide emitting the luminous radiation into the access area as a one of the plurality of light fields transversely to a longitudinal direction of the at least one light guide; and
 wherein at a receiving end, at least one light guide is provided as a decting element for detecting the one of the plurality of light fields transversely to the longitudinal direction of the at least one light guide at the receiving end and as transmitting means for transmitting the light out of the light field to the receiving element,
 wherein at least two light field regions arranged at an angle to one another cross within the access area, and
 wherein each light field region comprises at least two light fields which are arranged one above the other.

18. A method of monitoring an access area to a space which is to be monitored for the entry of at least one body by emitting luminous radiation by means of a plurality of light field regions comprising a plurality of light fields, each of the light fields including at least one emitting element which introduces luminous radiation into the access area and at least one receiving element which receives the luminous radiation, the method comprising:
 producing the plurality of light fields emitted from a light guide transversely to its longitudinal direction into the access area;
 detecting the light field at the receiving end through a light guide also transversely to its longitudinal direction; and
 transmitting the diffusely detected light to the receiving element within the light guide,
 wherein at least two light field regions arranged at an angle to one another cross within the access area, and
 wherein each light field region comprises at least two light fields which are arranged one behind the other in a direction of motion of the body.

19. A method in accordance with claim 18, wherein the luminous radiation for the light field is at least partially radiated with a component that is radial and axial in regard to the light guide.

20. A method in accordance with claim 18, wherein for each light field the luminous radiation is irradiated into an emitting light guide by a single emitting element and is received from a receiving light guide by a single receiver.

21. A method in accordance with claim 18, wherein for the purposes of determining the entry or passage of a body into or through the light field, shadowing of the light field in a direction of the receiving light guide is evaluated and an entry or a passage of a body is detected as soon as a total luminous power falls below a predefined or predefinable threshold value.

22. A method in accordance with claim 18, wherein the at least two mutually associated light fields are separately evaluated by an evaluating unit and are temporally correlated in respect of one or both of a falling below a threshold value or a total luminous power.

23. A method in accordance with claim 18, wherein at least two mutually associated light fields that are separately evaluated by an evaluating unit are arranged one above the other, and are temporally correlated in respect of one or both of a falling below a threshold value or a total luminous power.

24. A method in accordance with claim 18, wherein a timing waveform of a shadowing process corresponding to a reduction of a total luminous power corresponds to a profile of the body crossing the access area.

25. A method in accordance with claims 18, wherein a number of maximum shadowing effects is registered for determining a number of bodies.

26. A method in accordance with claim 25, wherein, if at least one light field region detects a plurality of shadow effects, a plurality of bodies are detected.

\* \* \* \* \*